(12) United States Patent
Saito (10) Patent No.: US 9,959,688 B2
(45) Date of Patent: May 1, 2018

(54) PORTABLE WIRELESS KEY

(71) Applicant: DENSO CORPORATION, Kariya, Aichi-pref (JP)

(72) Inventor: Toshiaki Saito, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/032,586

(22) PCT Filed: Oct. 15, 2014

(86) PCT No.: PCT/JP2014/005223
§ 371 (c)(1),
(2) Date: Apr. 27, 2016

(87) PCT Pub. No.: WO2015/064034
PCT Pub. Date: May 7, 2015

(65) Prior Publication Data
US 2016/0267728 A1    Sep. 15, 2016

(30) Foreign Application Priority Data

Oct. 30, 2013  (JP) ................................. 2013-225036

(51) Int. Cl.
| | | |
|---|---|---|
| G05B 19/00 | (2006.01) |
| G07C 9/00  | (2006.01) |
| H01H 9/02  | (2006.01) |
| H01H 13/04 | (2006.01) |
| H01H 13/70 | (2006.01) |
| B60R 25/24 | (2013.01) |

(52) U.S. Cl.
CPC ..... *G07C 9/00007* (2013.01); *G07C 9/00309* (2013.01); *G07C 9/00944* (2013.01);
(Continued)

(58) Field of Classification Search
CPC ............ G07C 9/00007; G07C 9/00111; G07C 9/00174; G07C 9/00309; H01H 13/04; H01H 13/70; H01H 19/04
(Continued)

(56) References Cited

U.S. PATENT DOCUMENTS

| 6,460,386 B1 | 10/2002 | Watanuki et al. |
| 2004/0069658 A1 | 4/2004 | Jeschke |

(Continued)

FOREIGN PATENT DOCUMENTS

| CN | 202596283 U | 12/2012 |
| CN | 202831836 U | 3/2013 |

(Continued)

*Primary Examiner* — Carlos E Garcia
(74) *Attorney, Agent, or Firm* — Harness, Dickey & Pierce, P.L.C.

(57) ABSTRACT

In a portable wireless key, decoration fitting portions provided at ends of a pair of side portions of a metal decoration member are fitted in decoration receiving portions of a wireless key body, and a decoration engaging portion provided at a connecting portion of the metal decoration member is engaged with a decoration engagement portion of the wireless key body. Further, a switch operation cover is fixed to an assembled unit of the wireless key body and the metal decoration member. Thus, durability in dropping can be improved without complicating an assembling work of the metal decoration member and without increasing the number of components and costs, and it is easy to address switch variations without increasing initial costs.

10 Claims, 10 Drawing Sheets

(52) U.S. Cl.
CPC .......... *H01H 9/0235* (2013.01); *H01H 13/04* (2013.01); *H01H 13/70* (2013.01); *B60R 25/24* (2013.01); *G07C 2009/00769* (2013.01); *G07C 2009/00984* (2013.01)

(58) Field of Classification Search
USPC ........................................ 340/5.6, 5.61, 5.64
See application file for complete search history.

(56) References Cited

U.S. PATENT DOCUMENTS

2007/0223743 A1* 9/2007 Honda ..................... H04R 9/02
                                                         381/152
2016/0278229 A1* 9/2016 Saito ..................... H01H 9/0235

FOREIGN PATENT DOCUMENTS

| | | |
|---|---|---|
| DE | 10028377 A1 | 2/2001 |
| DE | 10121045 A1 | 11/2002 |
| JP | H04137866 A | 5/1992 |
| JP | 2001217566 A | 8/2001 |
| JP | 3332993 B2 | 10/2002 |
| JP | 2009224921 A | 10/2009 |
| JP | 4562083 B2 | 10/2010 |
| JP | 4657086 B2 | 3/2011 |
| JP | 5065149 B2 | 10/2012 |
| JP | 2012195364 A | 10/2012 |

* cited by examiner

PORTABLE WIRELESS KEY

CROSS REFERENCE TO RELATED APPLICATIONS

This application is a U.S. National Phase Application under 35 U.S.C. 371 of International Application No. PCT/JP2014/005223 filed on Oct. 15, 2014 and published in Japanese as WO 2015/064034 A1 on May 7, 2015. This application is based on and claims the benefit of priority from Japanese Patent Application No. 2013-225036 filed on Oct. 30, 2013. The entire disclosures of all of the above applications are incorporated herein by reference.

TECHNICAL FIELD

The present disclosure relates to a portable wireless key to perform a control pertaining to locking and unlocking of a vehicle door lock through a wireless communication with a vehicle.

BACKGROUND ART

In recent years, an electronic key system, such as a smart entry system, has a portable wireless key to perform a control pertaining to locking and unlocking of a vehicle door lock. Such a portable wireless key is carried by a person like a mobile phone, and thus requires durability in dropping. Further, metal decoration members made of zinc die-casting have been widely used in portable wireless keys in order to improve design (decoration). In this case, the weight increases as compared to a conventional resin component. Therefore, a holding structure satisfying the durability in dropping is largely required. As a result, a fixing structure of the metal decoration member is complicated, and a workability in assembling increases. In addition, a component to make the holding structure for the durability in dropping is necessary, resulting in increases in the number of components and costs. In the portable wireless keys, the number of switches (operation portions) is different depending on vehicles, and designs according to the number of switches are necessary. Even when the number of the switches is the same, functions and arrangements are different. Thus, a large number of switch variations exist. To address the switch variation, for example, a patent literature 1 describes to make case components for respective switches. In such a case, however, initial costs increase.

PRIOR ART LITERATURE

Patent Literature

Patent Literature 1: JP 4657086 B2

SUMMARY OF INVENTION

It is an object of the present disclosure to provide a portable wireless key that is capable of improving durability in dropping without deteriorating the workability in assembling a metal decoration member and increasing the number of components and costs, and is capable of easily addressing to switch variations without increasing initial costs.

According to an aspect of the present disclosure, a portable wireless key performs at least a control pertaining to at least locking and unlocking of a vehicle door through a wireless communication with a vehicle. The portable wireless key includes a wireless key body, a switch operation cover and a metal decoration member. The wireless key body includes a circuit board therein. The circuit board has a push switch with a movable projection on a surface. The switch operation cover is made of a soft cover material that is capable of being deformed and restored from deformation. The switch operation cover has an operation portion that is deformed to be depressed according to a user's pressing operation and is restored to an original position to release the movable projection from a pressed state when being released from the user's pressing operation. the metal decoration member is disposed on an outer surface of the wireless key body.

The metal decoration member includes a pair of side portions extending to both ends, and a connecting portion connecting between the pair of side portions. The side portions have decoration fitting portions at the ends. The connecting portion has a decoration engaging portion. The wireless key body has a decoration receiving portion for receiving the decoration fitting portion, a decoration engagement portion for engaging with the decoration engaging portion, a cover engagement portion for engaging with a cover engaging portion of the switch operation cover thereby to detachably fix the switch operation cover. The metal decoration member is fixed to the wireless key body by engaging the decoration engaging portion with the decoration engagement portion and fitting the decoration fitting portion to the decoration receiving portion. The switch operation cover is fixed to an assembled unit of the wireless key body and the metal decoration member by engaging the cover engaging portion with the cover engagement portion.

As described above, to assemble the metal decoration member to the wireless key body, the decoration fitting portion provided at the ends of the pair of side portions of the metal decoration member are received in the decoration receiving portion of the wireless key body, and the decoration engaging portion provided at the connecting portion of the metal decoration member is engaged with the decoration engagement portion of the wireless key body. Further, the cover engaging portion of the switch operation cover is engaged with the cover engagement portion of the wireless key body, so the switch operation cover is fixed to the assembled unit of the wireless key body and the metal decoration member. Thus, the metal decoration member is firmly fixed by a simple assembling work without requiring a special fixing member, improving the durability in dropping without increasing the works for assembling the metal decoration member, the number of components, and the costs. Further, in the assembled state, the switch operation cover formed with operation portions is replaceable relative to the assembled unit of the wireless key body and the metal decoration member. Therefore, this configuration can be easily addressed to switch variations by simply replacing the switch operation cover provided with designs indicating operation functions of the operation portions, without increasing the initial costs.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

A portable wireless key of a present embodiment is, for example, employed to an electronic key system represented by vehicular keyless entry system, smart entry system, and smart start system. The portable wireless key at least has a wireless communication function to perform a wireless communication with an in-vehicle unit, and performs a control pertaining locking and unlocking of a vehicle door lock through the wireless communication. In such an electronic key system, the in-vehicle unit wirelessly outputs a polling wave toward a predetermined key searching area and wirelessly receives a response signal, thereby to search a portable wireless key present in the key searching area. The in-vehicle unit also authenticates an ID code wirelessly transmitted from the portable wireless key, and performs a predetermined control of the vehicle based on the result of authentication.

The portable wireless key of the present embodiment is configured as a smart key used for a vehicular smart entry system or smart start system. The smart entry system authenticates an ID code wirelessly transmitted from a portable wireless key present in a predetermined key searching area defined on a peripheral area outside of the vehicle, and provides a permission to unlock the door lock based on the result of authentication. When a predetermined unlocking operation of the door lock is detected in the state where the permission for unlocking the door lock is given, a door lock mechanism is operated to unlock the door lock. Namely, the smart entry system performs, based on the result of authentication, a control of switching the vehicle door lock mechanism between the unlock permitted state to enable unlocking according to a predetermined unlock operation and an unlock inhibited state to inhibit the unlocking.

The smart start system authenticates an ID code transmitted from a portable wireless key present in a predetermined key searching area defined in a passenger compartment of a vehicle, and provides a permission to start an engine based on the result of authentication. When a predetermined engine starting operation is detected in the state where the engine start permission is given, the engine is started. Namely, the smart start system performs, based on the result of authentication, a control of switching the vehicle engine between a start permitted state to permit the start of the vehicle engine according to a predetermined engine start operation and a start inhibited state to inhibit the engine start.

Figure 1:
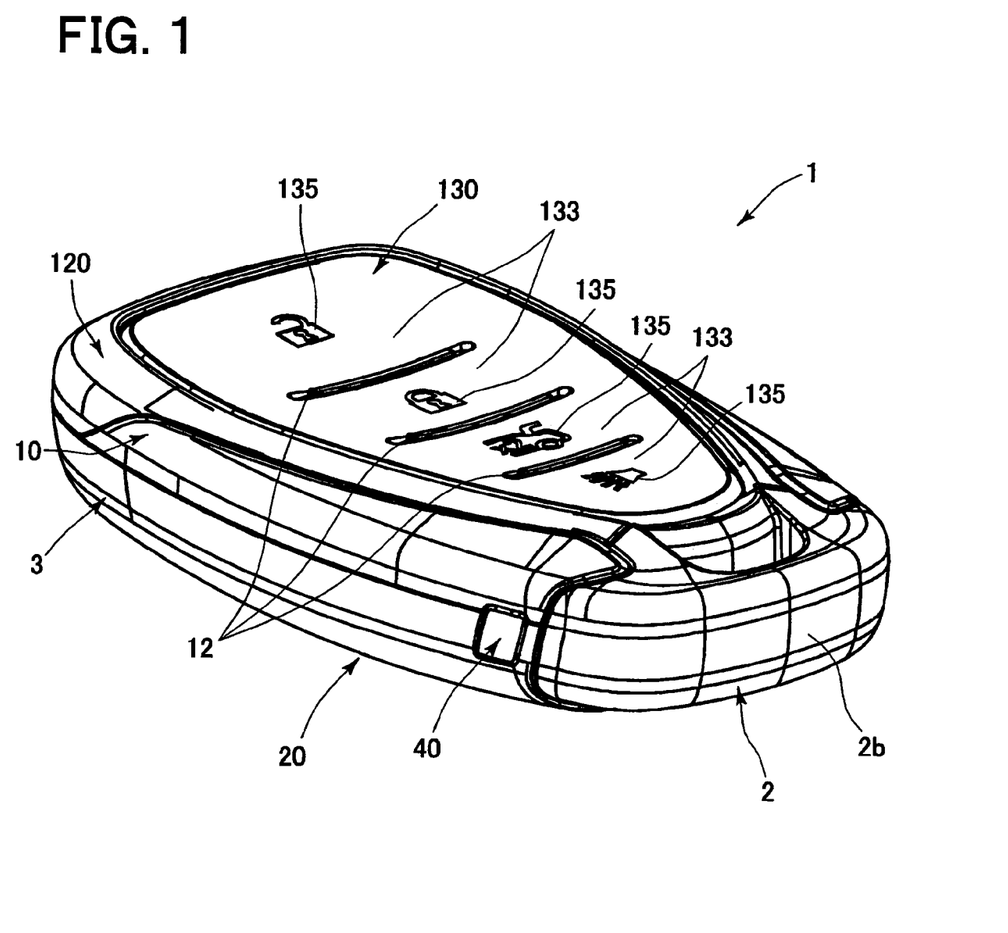
FIG. 1 is a perspective view of a portable wireless key according to an embodiment of the present disclosure.
Figure 2:
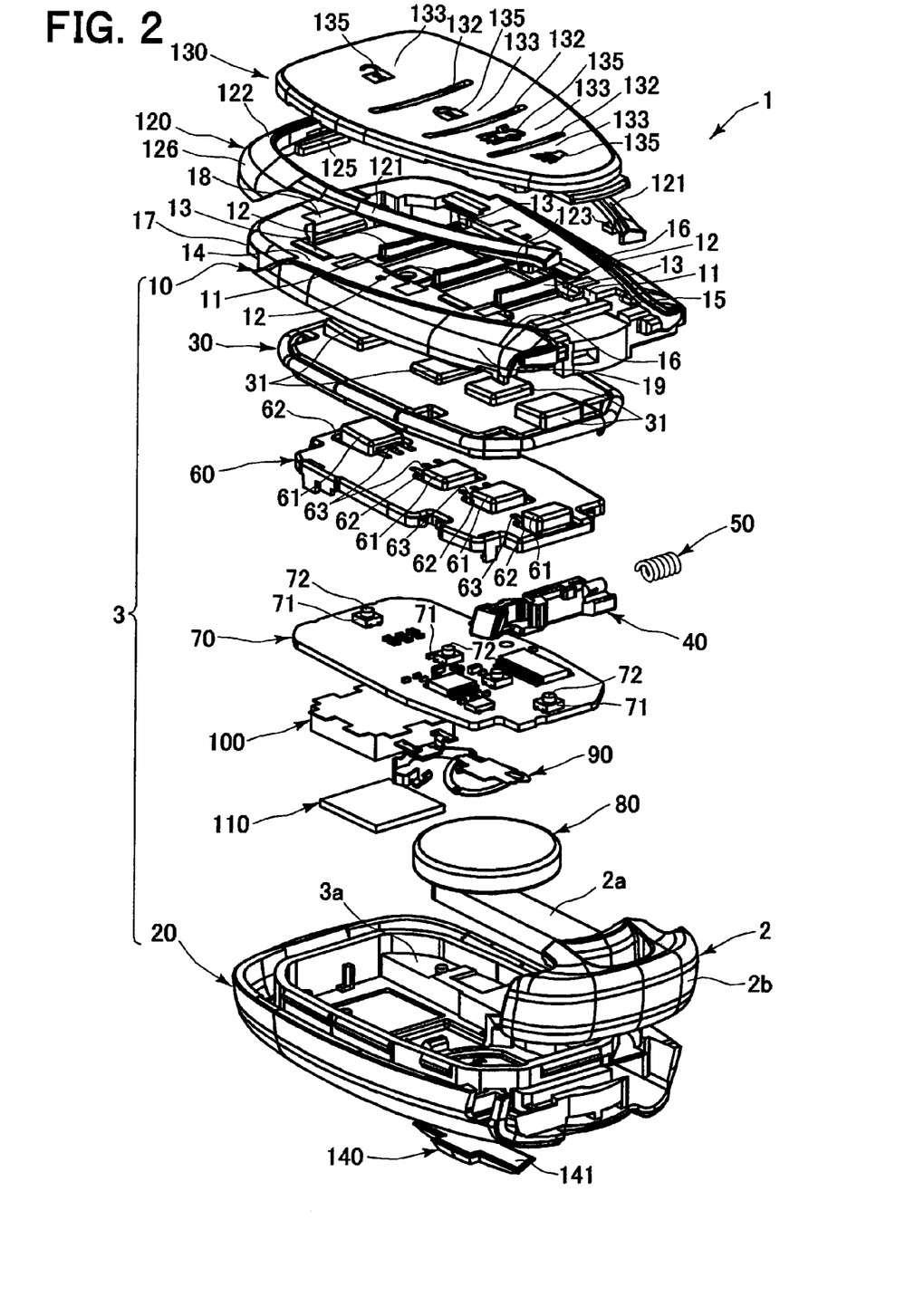
FIG. 2 is an exploded perspective view of the portable wireless key.

Hereinafter, an embodiment of a portable wireless key of the present disclosure will be described with reference to the drawings. As shown in FIG. 1 and FIG. 2, a portable wireless key 1 includes an emergency key 2 and a wireless key body 3. The emergency key 2 is used to directly lock or unlock the vehicle door lock when being inserted to a keyhole of the vehicle door. The wireless key body 3 accommodates the emergency key 2 therein. The emergency key 2 includes a key plate portion 2a to be inserted to the keyhole of the vehicle door, and a key holding portion 2b provided at the end of the key plate portion 2a. The emergency key 2 is held in a state of being inserted into a predetermined accommodation portion 3a inside of the wireless key body 3. The key holding portion 2b exposes outside when the key plate portion 2a is accommodated in the accommodation portion 3a of the wireless key body 3.

The wireless key body 3 has a case shape with substantially a rectangular parallelepiped shape corner portions of which are rounded to define a smooth outline. The wireless key body 3 is formed with the accommodation portion 3a for accommodating the emergency key 2, and the accommodation portion 3a extends in a longitudinal direction of the wireless key body 3. The accommodation portion 3a accommodates the key plate portion 2a so that the key plate portion 2a is received in the longitudinal direction. The accommodation portion 3a has a key groove engagement portion (not shown) that engages with a key groove of the key plate portion 2a accommodated therein. When the key groove of the key plate portion 2a is engaged with the key groove engagement portion of the accommodation portion 3a, the emergency key 2 is in a temporary unremovable and held state (in a state where the emergency key 2 can be removed with a predetermined force or more if a lock is released).

Figure 3:
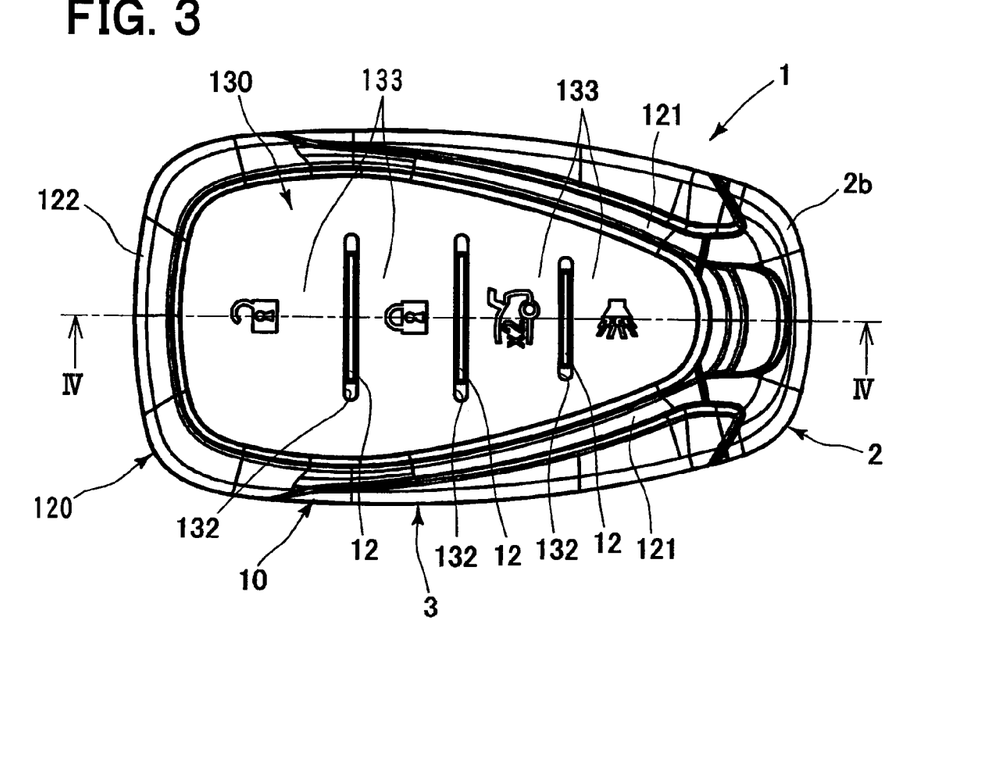
FIG. 3 is a plan view of the portable wireless key.
Figure 4:
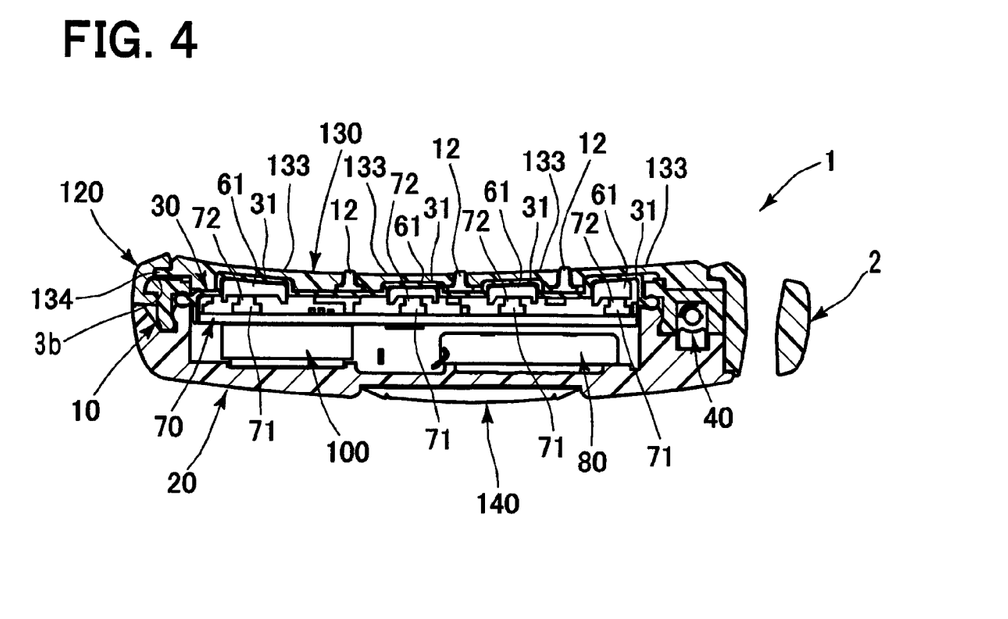
FIG. 4 is a cross-sectional view taken along a line IV-IV of FIG. 3.

The wireless key body 3 is separable up and down in its thickness direction, as shown in FIG. 3 and FIG. 4, and is integrally fixed in the form where an upper case 10 is laid on a lower case 20. The upper case 10 and the lower case 20 are each made of a resin material with high strength, such as a polycarbonate ABS resin (a resin in which polycarbonate resin and ABS resin are mixed). In an inner space provided between the upper case 10 and the lower case 20, an elastically deformable cover 30, a release button 40, a spring 50, a hard deformable cover 60, a circuit board 70, a battery 80, a terminal 90, a LF (low frequency) antenna 100, and a cushion sheet 110 are accommodated. A metal decoration member 120 and a switch operation cover 130 are fixed to an upper surface of the upper case 10, which forms a main surface of the wireless key body 3. An emblem 140 is fixed to a lower surface of the lower case 20.

Figure 5:
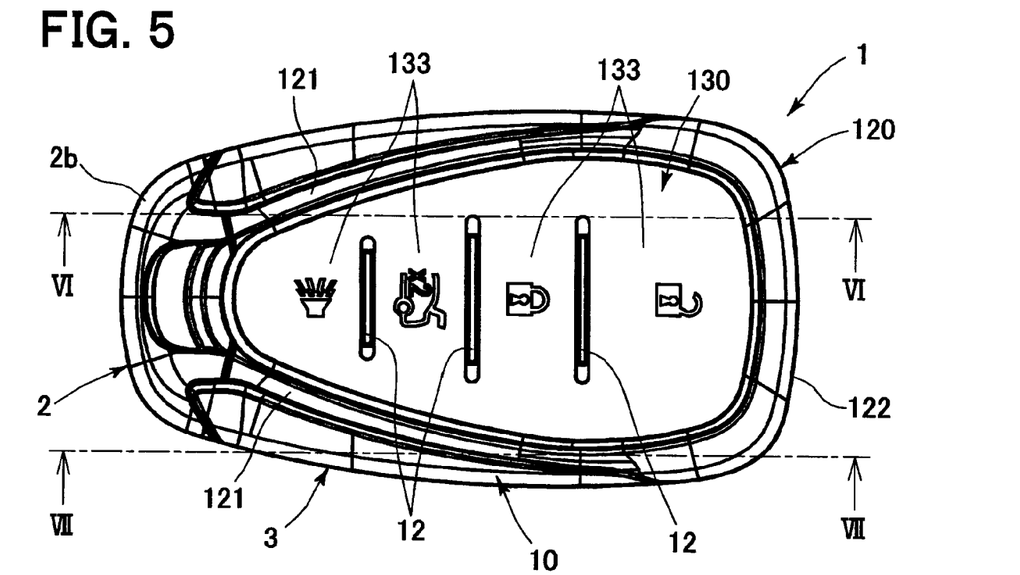
FIG. 5 is a plan view of the portable wireless key.
Figure 6:
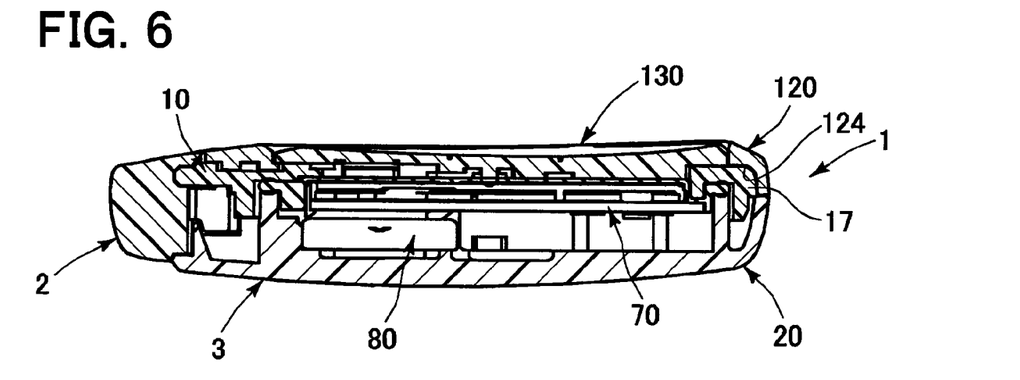
FIG. 6 is a cross-sectional view taken along a line VI-VI of FIG. 5.
Figure 7:
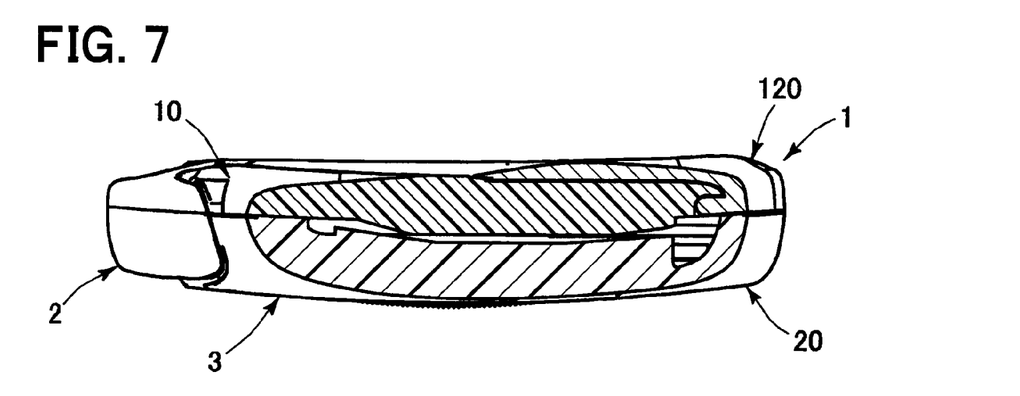
FIG. 7 is a cross-sectional view taken along a line VII-VII in FIG. 5.

As shown in FIG. 5 to FIG. 7, the upper case 10 and the lower case 20 forms a case shape having substantially a rectangular parallelepiped shape corners of which are rounded to define a smooth outline. The upper case 10 is formed with four openings 11 in the longitudinal direction. The openings 11 are each provided for transmitting a depressing deformation of an operation portion 133 of the switch operation cover 30 to a push switch 71 of the circuit board 70, in an assembled state of the portable wireless key 1. The four openings 11 are correspondingly provided for four push switches 71 of the circuit board 70. The upper case 10 is formed with partitioning projections 12 on its upper surface at positions between the respective openings 11 to partition the respective openings 11, that is, to partition the operation portions 133. The upper case 10 is also formed with cover engagement portions 13 for fixing the switch operation cover 130 to the upper case 10. The cover engagement portions 13 are formed on opposite sides of the two openings 11, the two openings 11 being front and rear ends among the four openings 11.

Figure 8:
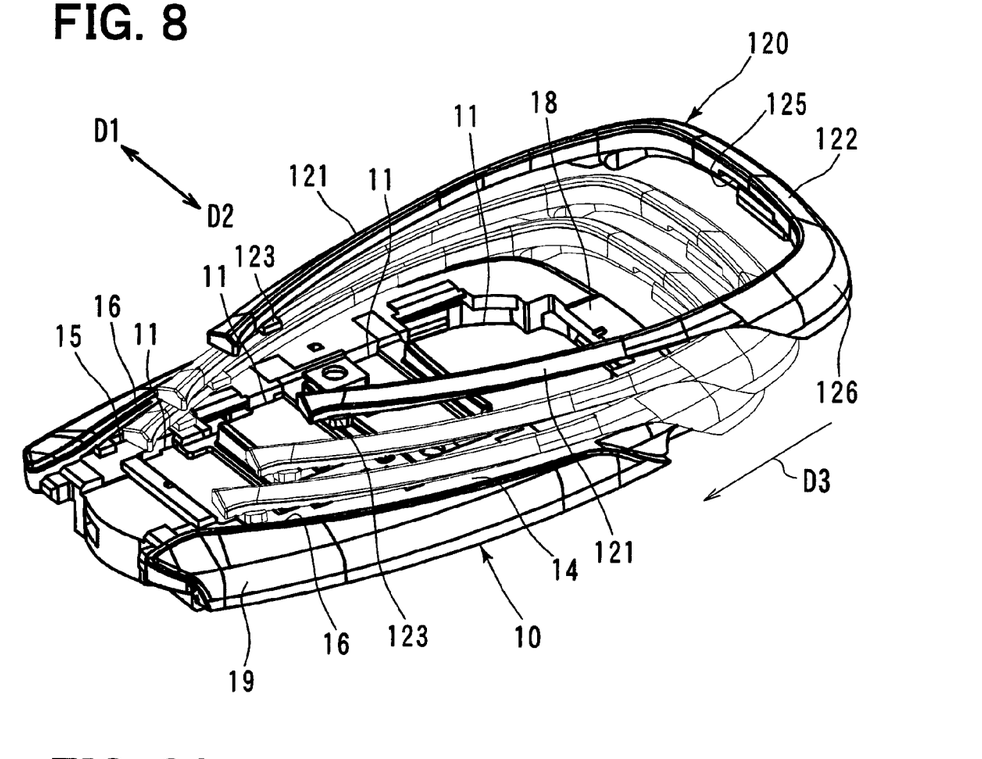
FIG. 8 is a perspective view for illustrating a fixing state of a metal decoration member to an upper case of the portable wireless key.
Figure 9A:
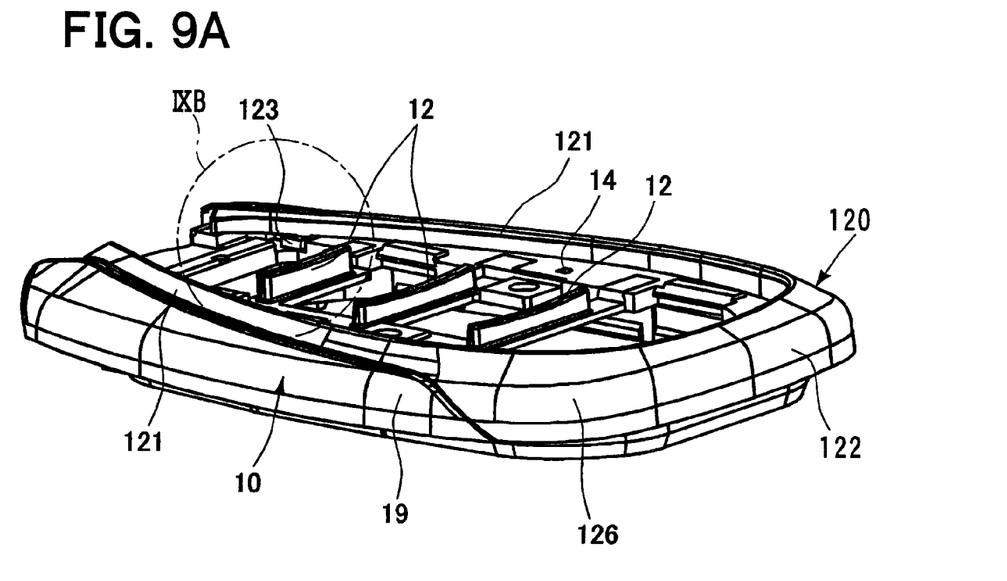
FIG. 9A is a perspective view for illustrating a fitting state of a decoration fitting portion of the metal decoration member and a decoration receiving portion of the upper case.
Figure 9B:
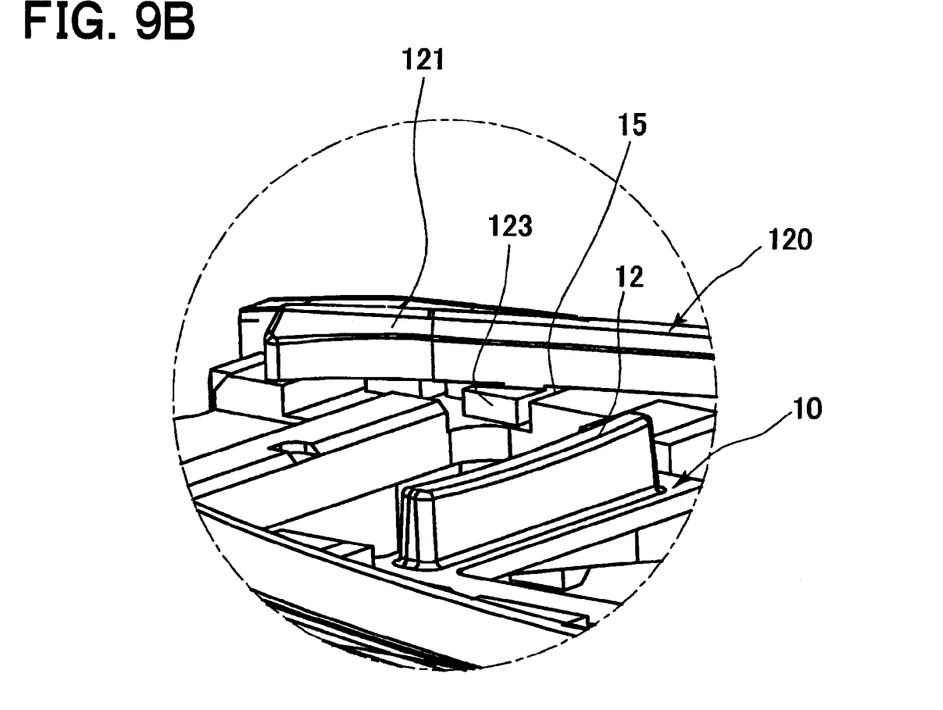
FIG. 9B is an enlarged view of a part IXB of FIG. 9A.

The upper case 10 is formed with a decoration fixing recess 14 on its upper surface for fixing the metal decoration member 120, as shown in FIG. 8 and FIG. 9A. The decoration fixing recess 14 is formed into a recessed surface shape to correspond to an outer shape of the metal decoration member 120. Decoration receiving portions 15, which have a recessed shape, are formed at ends of opposed inner surfaces of the decoration fixing recess 14 to receive the decoration fitting portions 123 of the metal decoration member 120. The opposed inner surfaces of the decoration fixing recess 14, at the ends of which the decoration receiving portions 15 are formed, are each configured as a slide guide portion 16 that guides the decoration fitting portion 123 to the position of the decoration receiving portion 15 in a slide manner (see an arrow D3 in FIG. 8), in a state where end portions 121 of the metal decoration member 120 are deflected inwardly. On the other end (rear end) of the decoration fixing recess 14 opposite to the one end (front end) on which the decoration receiving portions 15 are formed, a pair of right and left decoration engagement portions 17 in the form of projection are formed to respectively engage with the pair of the decoration engaging portions 124 of the metal decoration member 120 (see FIG. 6), and a recess 18 forming the engagement recess 3b for fixing the switch operation cover 130 in the assembled unit with the metal decoration member 120 is formed (see FIG. 12).

The elastically deformable cover 30 is made of a material that hardly absorbs moisture and has elasticity, such as rubber. The elastically deformable cover 30 is fixed to cover the hard deformable cover 60 and the circuit board 70 from the top. Thus, the elastically deformable cover 30 functions to restrict water or the like, which has entered into the switch operation cover 130 through a gap, from reaching the circuit board 70 through the openings 11 of the upper case 10 (i.e., functions as waterproof structure), and functions to transmit a pressing operation (depressing deformation) of the operation portion 133 of the switch operation cover 130 toward the circuit board 70 by being elastically deformed. The elastically deformable cover 30 is formed with projected step portions 31 projecting upwardly in the form of step at positions corresponding to the four operation portion 133 of the switch operation cover 130.

The release button 40 functions as a removing button to remove the emergency key 2 from the wireless key body 3. The spring 50 applies a force to restore the release button 40 operated by a user to the original position.

Figure 10:
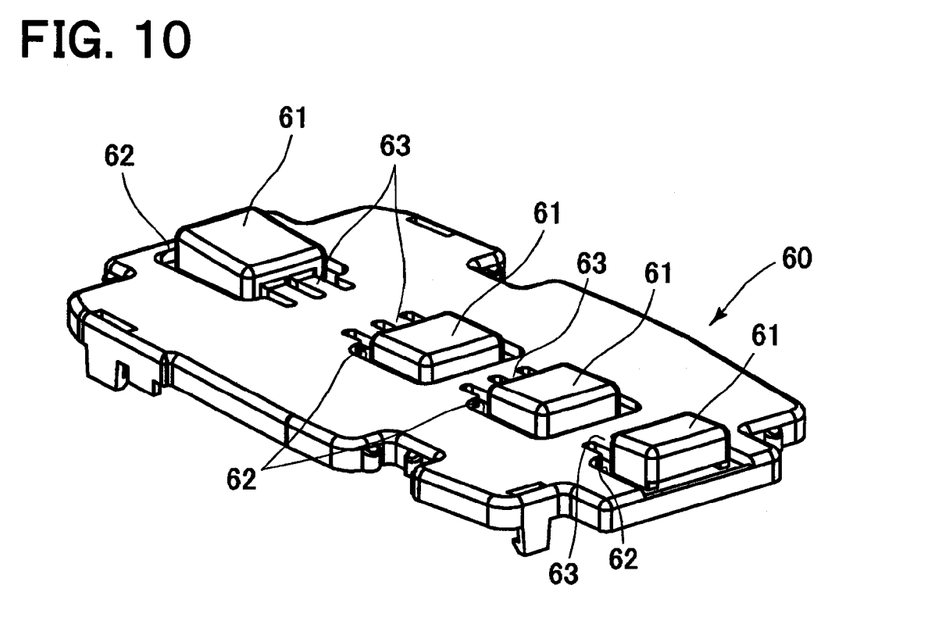
FIG. 10 is an upper perspective view of a hard deformable cover of the portable wireless key.
Figure 11:
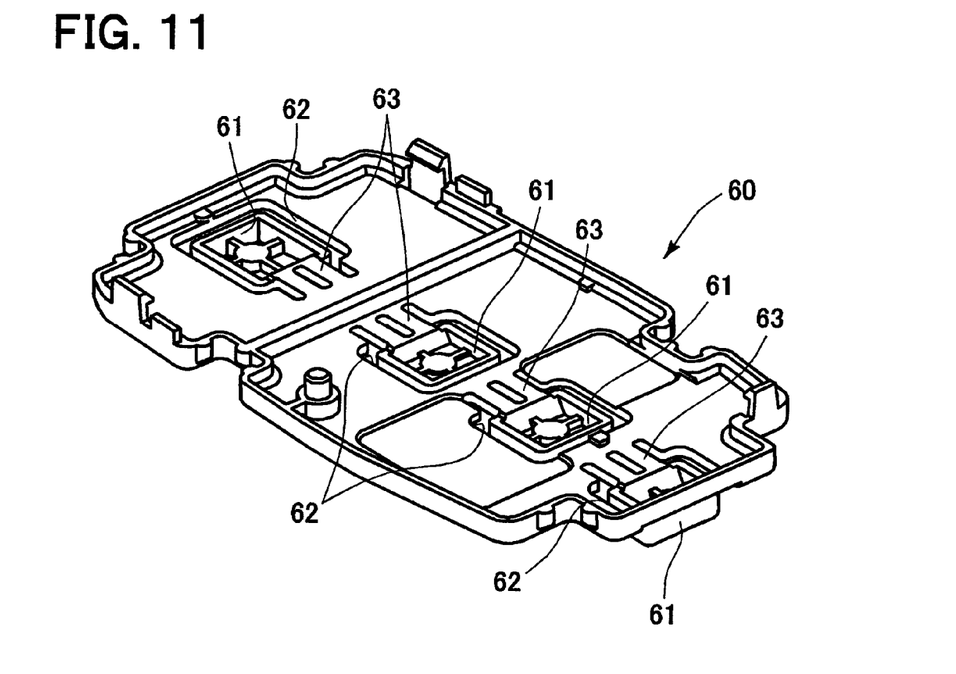
FIG. 11 is a lower perspective view of the hard deformable cover of the portable wireless key.

The hard deformable cover 60 is made of a hard resin material, such as polycarbonate. The hard deformable cover 60 is formed with swing portions 61 at positions corresponding to the four operation portions 133 of the switch operation cover 130, that is, the four push switches 71 of the circuit board 70. The swing portions 61 are in the form of projection projecting upwardly. As shown in FIG. 10 and FIG. 11, a cutout portion 61 is formed at a part on a periphery of each swing portion 61, which is in the form of projection, and a portion of the periphery of the swing portion 61 where the cutout portion 62 is not formed provides a flexible portion 63 that allows the swing portion 61 to move up and down according to the operation of the operation portion 133.

The circuit board 70 has substantially a rectangular plate shape in a plan view. The four push switches 71 of the pressing-button type are mounted on the upper surface of the circuit board 70. The four push switches 71 each have a movable projection 72 for detecting the pressing operation, and is disposed to correspond to the swing portion 61 of the hard deformable cover 60, the projected step portion 31 of the elastically deformable cover 30, the opening 11 of the upper case 10, the operation portion 133 of the switch operation cover 130, which are sequentially laid on top of the other on the circuit board 70. The movable projection 72 is pressed according to the elastic deformation of the projected step portion 31 and the swing motion of the swing portion 61 when the operation portion 133 is operated in a pressed manner. On the lower side of the circuit board 70, the battery 80, the terminal 90 and the LF antenna 100, which are electronic components for the wireless communication with the vehicle, are arranged. The cushion sheet 110 is interposed between the LF antenna 100 and the lower case 20 to absorb an impact to the electronic components through the upper case 10 and the lower case 20.

The metal decoration member 120 is made of a zinc die-casting. The metal decoration member 120 has a U-shape along an outer side surface of the wireless key body 3 (upper case 10), that is, a U-shape corresponding to the decoration fixing recess 14 formed in the upper case 10. The metal decoration member 120 is fixed to the decoration fixing recess 14. The metal decoration member 120, which has the U-shape, includes a pair of side portions 121 extending from one end to another end, and a connecting portion 122 connecting between the pair of side portions 121. The side portions 121 are flexible in the right and left direction of the metal decoration member 120 (D1 and D2 directions in FIG. 8, first directions substantially parallel to the longitudinal direction of the connecting portion 122). The side portions 121 have decoration fitting portions 123 for fitting in the decoration receiving portions 15 of the upper case 10 at tip ends thereof.

The connecting portion 122 has a pair of decoration engaging portions 124 correspondingly engaging with the pair of decoration engagement portions 17 of the upper case 10. Also, the connecting portion 122 is formed with a recessed portion 125 that forms an engagement recess 3b with the recess 18 of the upper case 10 in the assembled unit with the upper case 10. The outer surface 126 of the metal decoration member 120 has a shape that forms a continuously curved surface with the outer surface 19 of the upper case 10 in a state where the metal decoration member 120 is fixed to the decoration fixing recessed portion 14 of the wireless key body 3 (upper case 10).

Figure 12:
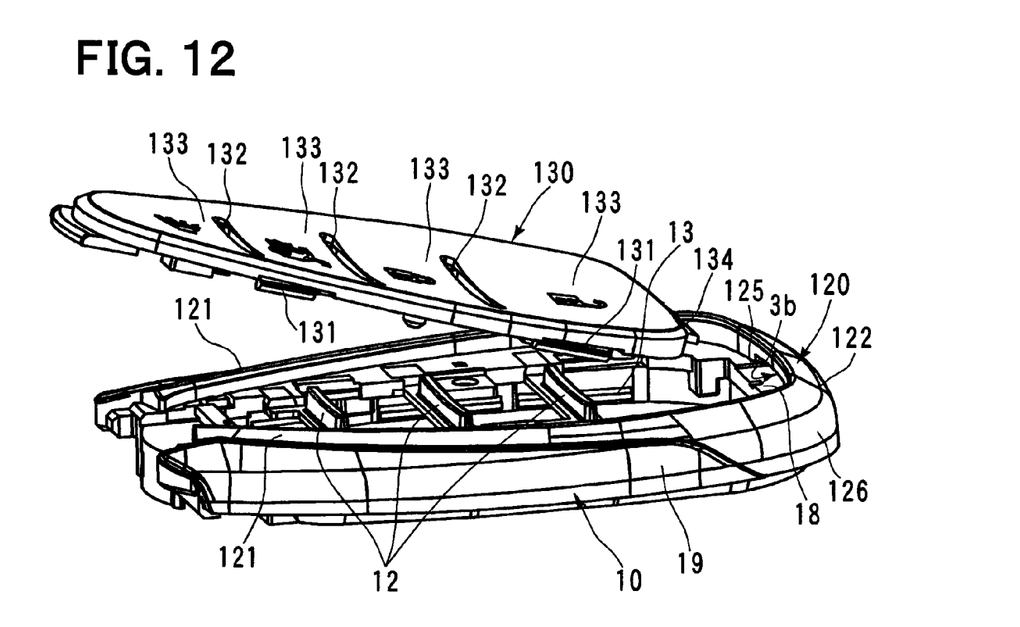
FIG. 12 is a perspective view for illustrating a fixing state of a switch operation cover to an assembled unit of the metal decoration member and the upper case.
Figure 13A:
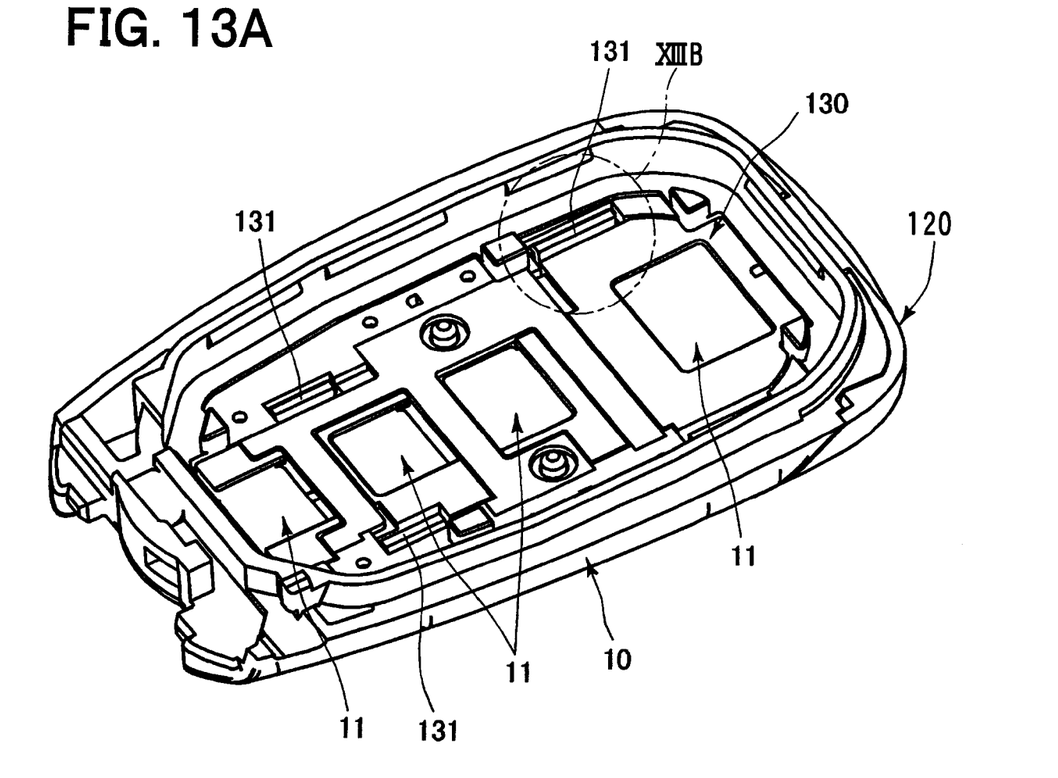
FIG. 13A is a perspective view for illustrating an engagement state of a cover engaging portion of the switch operation cover and a cover engagement portion of the upper case.
Figure 13B:
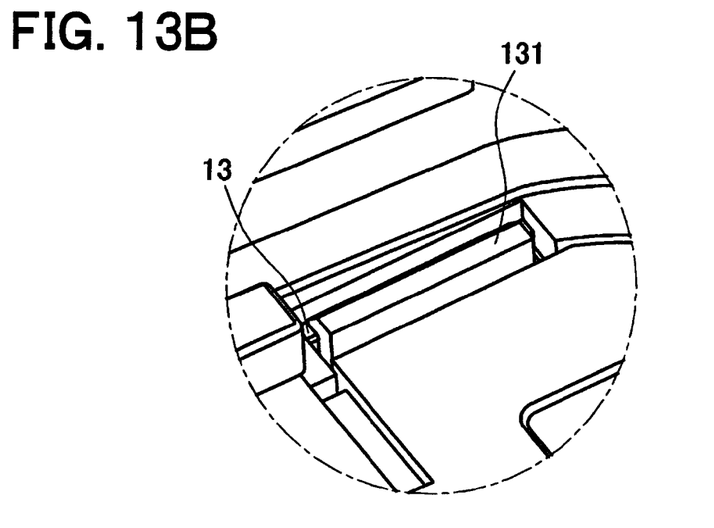
FIG. 13B is an enlarged view of a part XIIIB of FIG. 13A.
Figure 14:
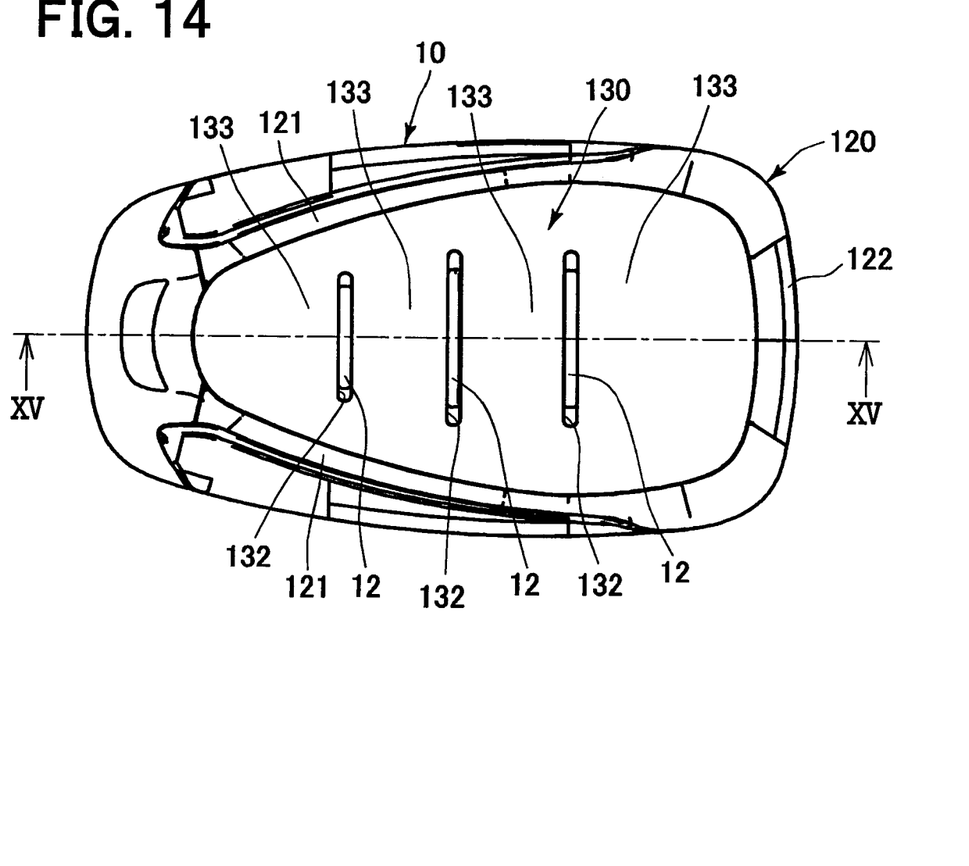
FIG. 14 is a plan view of an assembled unit of the metal decoration member, the upper case and the switch operation cover.
Figure 15:
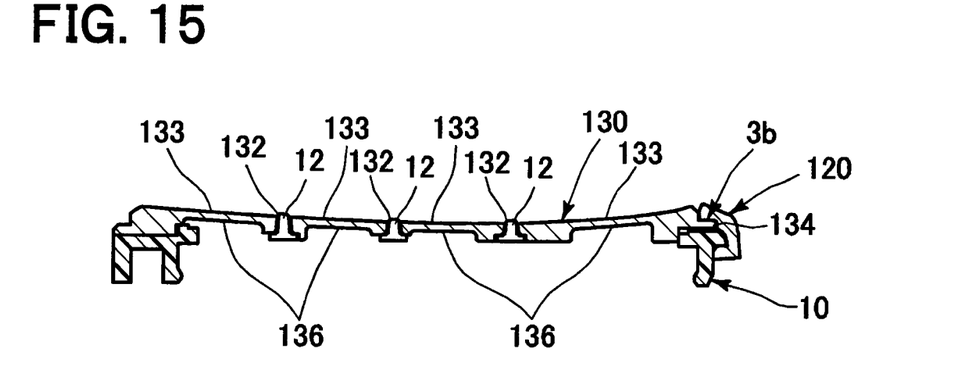
FIG. 15 is a cross-sectional view taken along a line XV-XV in FIG. 14.
Figure 16A:
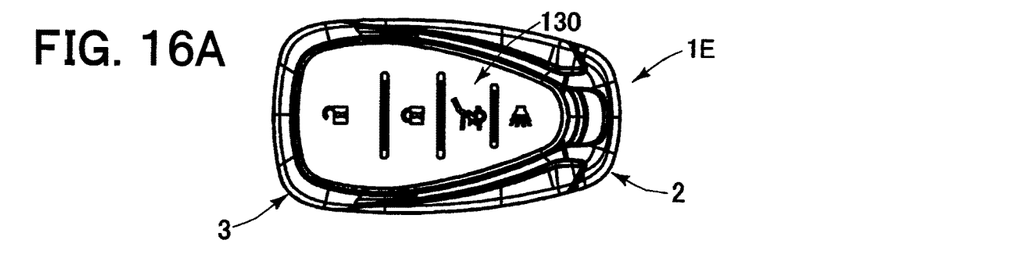
FIG. 16A is a plan view of an example of a portable wireless key having a different function according to the type of a switch operation cover.
Figure 16B:
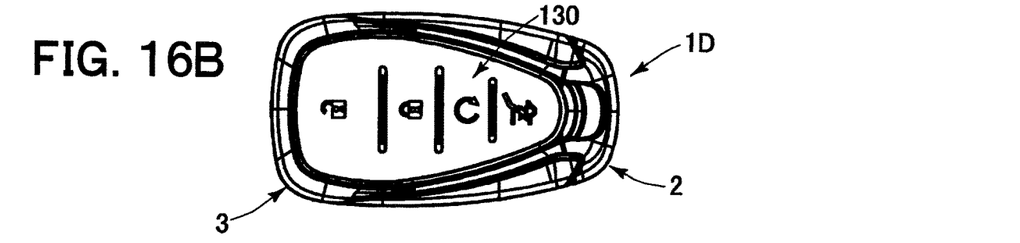
FIG. 16B is a plan view of an example of a portable wireless key having a different function according to the type of a switch operation cover.
Figure 16C:
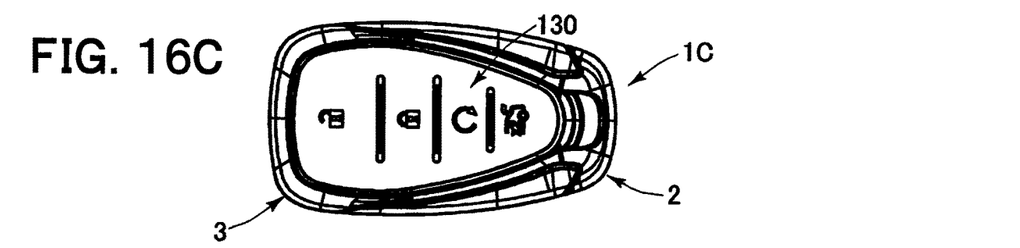
FIG. 16C is a plan view of an example of a portable wireless key having a different function according to the type of a switch operation cover.
Figure 16D:
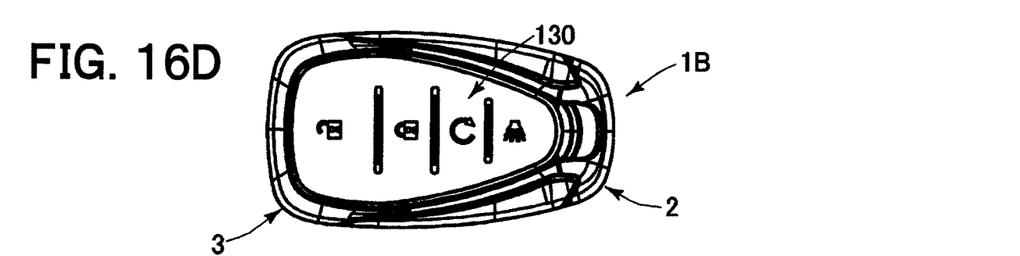
FIG. 16D is a plan view of an example of a portable wireless key having a different function according to the type of a switch operation cover.
Figure 16E:
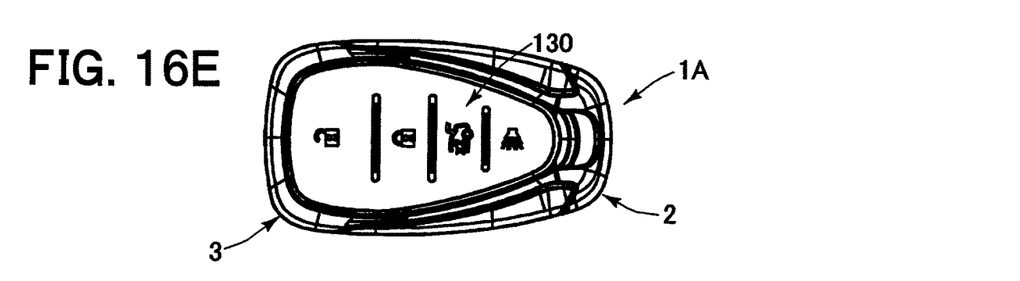
FIG. 16E is a plan view of an example of a portable wireless key having a different function according to the type of a switch operation cover.

The switch operation cover 130 has a flat portion made of a rubber material and a resin portion integrally molded with the flat portion on the lower surface of the flat portion. On a lower surface portion of the switch operation cover 130 made of the resin material, as shown in FIG. 12, FIG. 13A and FIG. 13B, nail-shaped cover engaging portions 131 are formed for fixing the switch operation cover 130 to the upper case 10 when engaged with the cover engagement portions 13. As shown in FIG. 14 and FIG. 15, the switch operation cover 130 is formed with insertion groove portions 132 for correspondingly receiving the three partitioning projections 12 of the upper case 10. The four areas partitioned by the insertion groove portions 132 form the operation portions 133 that are individually operated for pressing the four push switches 71. The switch operation cover 130 has an engagement projection 134 for fixing at its rear end to be engaged with the engagement recessed portion 3b of the assembled unit of the upper case 10 and the metal decoration member 120.

The four push switch 71 are switches for controlling functions of unlocking and locking of the door lock, opening a trunk of the vehicle, generating an alarm. On the four surfaces of the operation portions 133 of the switch operation cover 130, design marks 135 for schematically indicating the respective functions are pad-printed. On the rear surface of each operation portion 133, a recessed surface portion 136 for receiving the swing portion 61 of the hard deformable cover 60 through the projected step portion 31 of the elastically deformable cover 30 is formed. The emblem 140 is fixed to the lower outer surface of the lower case 20 through an adhesive tape 141 adhered to the lower outer surface of the lower case 20.

The portable wireless key 1 of the present embodiment is configured to control the functions of the unlocking and locking of the door lock, opening the trunk of the vehicle, generating the alarm, as described above. However, the functions to be controlled by the portable wireless key 1 (four push switches 71) are not limited to the functions described above. For example, in a case where the functions to be controlled by the portable wireless key 1 (four push switches 71) are changed with various specifications, a switch operation cover 130 having design marks 135 according to the changed specifications is merely fixed. Thus, it can be easily addressed to various switches without increasing initial costs.

By replacing a switch operation cover 130 having different design marks 135, various portable wireless keys, such as portable wireless keys 1A to !e as shown in FIG. 16A to 16E can be made as switch variations of the portable wireless key 1 of the present embodiment. A portable wireless key 1A as the portable wireless key 1 of the present embodiment has the control functions of the locking and unlocking of the door lock, the opening of the trunk, and the generation of the alarm. The portable wireless key 1B has control functions of locking and unlocking of the door lock, remote starting, and generating an alarm. The portable wireless key 1C has control functions of locking and unlocking of the door lock, remote starting, and opening a vehicle trunk. The portable wireless key 1D has control functions of locking and unlocking of the door lock, remote starting and opening of a back door. The portable wireless key 1E has control functions of locking and unlocking of the door lock, opening of the back door, and generating an alarm.

In the present embodiment, as described above, the portable wireless key 1 performs at least the control pertaining the unlocking and locking of the vehicle door lock through the wireless communication with the vehicle. The portable wireless key 1 includes the wireless key body 3, the switch operation cover 130 and the metal decoration member 120. The wireless key body 3 has the circuit board 70 therein. The circuit board 70 has the push switches 71 on the surface. The push switches 71 have the movable projections 72. The switch operation cover 130 is made of a soft cover material that allows deformation and restoration from the deformation. The switch operation cover 130 has the operation portions 133 that are deformed to depress by the user's pressing operation, and to restore when being released from the user's pressing operation. The metal decoration member 120 is disposed on an outer surface of the wireless key body 3. The metal decoration member 120 includes the pair of side portions 121 extending from one end to another end, and the connecting portion connecting between the pair of side portions 121. The side portions 121 have the decoration fitting portions 123 at the ends. The connecting portion 122 has the decoration engaging portion 124. The wireless key body 3 has the decoration receiving portions 15 for receiving the decoration fitting portions 123, the decoration engagement portions 17 for engaging with the decoration engaging portions 124, and the cover engagement portion 13 for engaging with the cover engaging portion 131 of the switch operation cover 130 thereby to detachably fix the switch operation cover 130. The metal decoration member 120 is fixed to the wireless key body 3 by engaging the decoration engaging portions 124 with the decoration engagement portions 124 and by fitting the decoration fitting portions 123 to the decoration receiving portions 125. The switch cover 130 is fixed to the assembled unit of the wireless key body 3 and the metal decoration member 120 by engaging the cover engaging portion 131 with the cover engagement portion 13.

As described above, when the metal decoration member 120 is assembled to the wireless key body 3, the decoration fitting portions 123 provided at the ends of the pair of side portions 121 of the metal decoration member 120 are fitted in the decoration receiving portions 15 of the wireless key body 3, and the decoration engaging portions 124 provided on the connecting portion 122 of the metal decoration member 120 are engaged with the decoration engagement portions 17 of the wireless key body 3. Further, the cover engaging portions 131 of the switch operation cover 130 are engaged with the cover engagement portions 13 of the wireless key body 3. Thus, the switch operation cover 130 is fixed to the assembled unit of the wireless key body 3 and the metal decoration member 120. As such, the metal decoration member 120 can be firmly fixed by a simple work without requiring a special fixing member, and thus the durability in dropping can be improved without complicating the assembling work of the metal decoration member 120 and without increasing the number of components and the costs. Further, in this assembled state, the switch operation cover 130 formed with the operation portions 133 is replaceable relative to the assembled unit of the wireless key body 3 and the metal decoration member 120. Therefore, it is possible to easily address to switch variations only by replacing the switch operation cover 130 having designs indicating the operation functions of the operation portions 133, without increasing the initial costs.

As a more detailed assembling structure of the above described wireless key body 3, metal decoration member 120 and the switch operation cover 130, it is configured as follows: the side portions 121 are flexible in the right and left directions of the meal decoration member 120; the decoration receiving portions 15 receive the decoration fitting portions 123 to restrict movements of the decoration fitting portions 123 in front and rear directions and up and down directions; the decoration engagement portions 17 engage with the decoration engaging portions 124 to restrict up and down movements of the decoration engaging portions 124; the decoration fitting portions 123 are fitted in the decoration receiving portions 15 by means of the flexible restoring of the side portions 121 to restrict movements of the metal decoration member 120 in the front and rear directions and the up and down directions; and the switch operation cover 130 restricts the movements of the metal decoration member 120 in the left and right direction, which corresponds to directions in which the side portions 121 deflect, since the cover engaging portions 131 are engaged with the cover engagement portions 13. In this case, the left and right direction of the metal decoration member 120 corresponds to a first direction that is substantially parallel to the longitudinal direction of the connecting portion 122, and the front and rear direction corresponds to a second direction that is perpendicular to the left and right direction (first direction). Also, the up and down direction corresponds to a third direction that is perpendicular to the left and right direction (first direction) and the front and rear direction (second direction). Further, the front and rear direction also corresponds to the longitudinal direction of the wireless key body 3.

The multiple push switches 70 are disposed on the circuit board 70. The switch operation cover 130 has the operation portions 133 that are correspondingly provided for the push switches 71. Since the integral hard deformable cover 60 is provided for the multiple push switches 71, the number of components can be reduced. Further, variations of switches can be increased by variously changing the function controls of the plurality of push switches 71.

The design marks 135, which design the functions of the push switches corresponding to the operation portions 133, are formed on the surface of the switch operation cover 130 where the operation portions 133 are provided. Thus, a user can easily recognize the function controls of the plurality of operation portions 133 (push switches 71). To change the function controls of the portable wireless key 1 (push switches 71) to various specifications, the switch operation cover 130 having the design marks 135 according to the respective specification is fixed. Thus, it is easily addressed to switch variations without increasing the initial costs.

The wireless key body 3 (upper case 10) is provided with the slide guide portion 16 that guides the decoration fitting portions 123 to positions to be received into the decoration receiving portions 15. Therefore, the work for assembling the metal decoration member 120 to the wireless key body 3 can be eased.

The metal decoration member 120 has the U-shape along the outer side surface of the wireless key body 3, and is fixed to the decoration fixing recess 14 formed on the outer side surface of the wireless key body 3. Therefore, the outer side surface of the portable wireless key 1 (wireless key body 3) can be decorated with the U-shaped metal decoration member 120.

The outer surface 126 of the metal decoration member 120 forms a continuous curved surface with the outer surface 19 of the wireless key body 3 in a state where the metal decoration member 120 is fixed to the decoration fixing recess 14. Therefore, the sense of unity can be provided in the assembled state of the wireless key body 3 and the metal decoration member 120.

The embodiment of the present disclosure is described hereinabove. However, the embodiments described hereinabove are only examples, and the present embodiment is not limited to the embodiments. Variable modifications may be adoptable without departing from the gist of the claims. In the structure described in the above embodiment, the metal decoration member is exemplarily made of the zinc die-casting. However, the metal decoration member is not limited to such a material. The metal decoration member may have any configuration as long as it is made of a metal material.

In the embodiment described above, the metal decoration member is fixed to the upper case forming the main surface (the surface to which the operation portion is disposed) of the wireless key body. However, the structure of the wireless key body is not limited such a structure. The metal decoration member may be fixed to the lower case, which forms the surface opposite to the main surface of the wireless key body, or may be fixed to extend over the upper case and the lower case.

The shape of the metal decoration member having the pair of the side portions extending from the rear end to the front end and the connecting portion connecting between the pair of the side portions is described as having the U-shape. However, the U-shape is not limited to an exact U-shape (i.e., the connecting portion have the curved shape). The shape of the metal decoration member may have a gate-like shape (e.g. a shape in which the connecting portion has a straight shape, and the pair of side portions extending perpendicularly from the connecting portion). That is, the metal decoration member may have a shape having an opening on one side.

What is claimed is:

1. A portable wireless key that performs at least a control pertaining to locking and unlocking of a door lock of a vehicle through a wireless communication with the vehicle, the portable wireless key comprising:
   a wireless key body having a circuit board therein, the circuit board having a push switch on a surface, the push switch having a movable projection;
   a switch operation cover made of a soft cover material that is capable of being deformed and restored from deformation, the switch operation cover having an operation portion that is deformed to be depressed to press the movable projection according to a user's pressing operation and is deformed to be restored to an original position to release the movable projection from a pressed state when being released from the user's pressing operation; and
   a metal decoration member disposed on an outer surface of the wireless key body, wherein
   the metal decoration member has a pair of side portions extending from one end to another end of the metal decoration member, and a connecting portion connecting between the pair of side portions,
   the side portions have decoration fitting portions at ends thereof,
   the connecting portion has a decoration engaging portion,
   the wireless key body has decoration receiving portions that receive the decoration fitting portions, a decoration engagement portion that engages with the decoration engaging portion, and a cover engagement portion that engages with a cover engaging portion of the switch operation cover to detachably fix the switch operation cover on the wireless key body, the metal decoration member is fixed to the wireless key body in such a manner that the decoration engaging portion is engaged with the decoration engagement portion and the decoration fitting portions are received in the decoration receiving portions, and the switch operation cover is fixed to an assembled unit of the wireless key body and the metal decoration member in such a manner that the cover engaging portion is engaged with the cover engagement portion.

2. The portable wireless key according to claim 1, wherein the side portions are flexible in a left and right direction of the metal decoration member, the decoration receiving portions receive the decoration fitting portions and restrict the decoration fitting portions from moving in a front and rear direction and in an up and down direction, the decoration engagement portion engages with the decoration engaging portion and restricts the decoration engaging portion from moving in the up and down direction, the decoration fitting portions are received in the decoration receiving portions by means of flexible restoration of the side portions and restrict the metal decoration member from moving in the front and rear direction and in the up and down direction, and the cover engaging portion is engaged with the cover engagement portion so that the switch operation cover restricts the metal decoration member from moving in the left and right direction, which corresponds to a direction in which the side portions are flexible.

3. The portable wireless key according to claim 1, wherein the circuit board has a plurality of push switches including the push switch, the switch cover has a plurality of operation portions including the operation portion, and the plurality of operation portions are correspondingly provided for the plurality of push switches.

4. The portable wireless key according to claim 3, wherein the switch operation cover has a surface providing the plurality of operation portions, and the surface of the switch operation cover is provided with marks designing functions of the push switches corresponding to the operation portions.

5. The portable wireless key according to claim 1, wherein the wireless key body has a slide guide portion that guides the decoration fitting portions in a sliding manner to positions to be received in the decoration receiving portions.

6. The portable wireless key according to claim 1, wherein the metal decoration member has a U-shape along an outer side surface of the wireless key body, and the metal decoration member is fixed to a decoration fixing recess provided on the outer side surface of the wireless key body.

7. The portable wireless key according to claim 6, wherein the metal decoration member has an outer surface that forms a continuous curved surface with the outer surface of the wireless key body in a state where the metal decoration member is fixed to the decoration fixing recess.

8. The portable wireless key according to claim 1, wherein the wireless key body includes an upper case and a lower case each being made of a resin material, the upper case and the lower case forming an inner space for accommodating the circuit board therein when being fixed together, and the metal decoration member and the switch operation cover are fixed to the upper case.

9. The portable wireless key according to claim 1, wherein the wireless key body accommodates an emergency key therein.

10. The portable wireless key according to claim 1, wherein the wireless key body further includes an upper case having partitioning projections formed therein, and the switch operation cover further includes insertion groove portions formed therein, each insertion groove portion correspondingly receiving each partitioning projection.

* * * * *